Aug. 8, 1972  G. H. MAHER  3,682,766
LOW TEMPERATURE FIRED RARE EARTH-TITANATE
CERAMIC BODY AND METHOD OF MAKING SAME
Filed Nov. 23, 1970
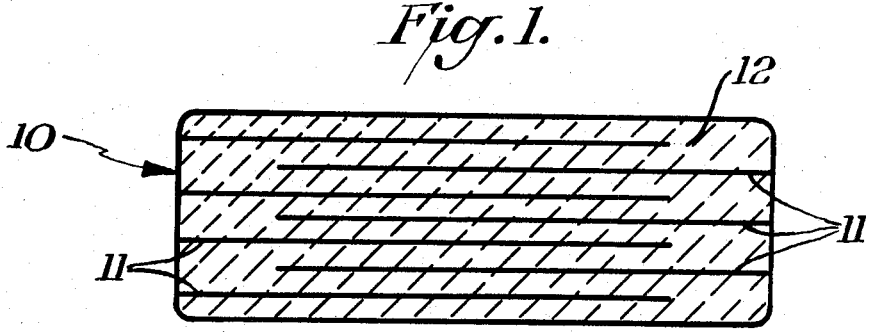
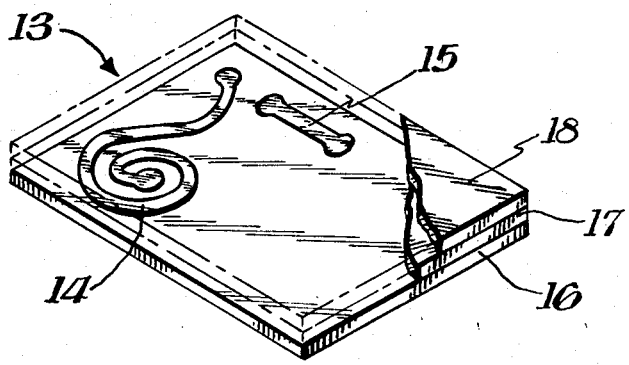

3,682,766
**LOW TEMPERATURE FIRED RARE EARTH TITA-
NATE CERAMIC BODY AND METHOD OF MAK-
ING SAME**
Galeb H. Maher, Adams, Mass., assignor to Sprague
 Electric Company, North Adams, Mass.
Continuation-in-part of applications Ser. No. 626,245,
 Mar. 27, 1967, now abandoned, and Ser. No. 767,046,
 Sept. 26, 1968, now Patent No. 3,619,220. This ap-
 plication Nov. 23, 1970, Ser. No. 91,706
 Int. Cl. B32b *17/06;* C04b *33/00;* H01b *1/06*
U.S. Cl. 161—196           8 Claims

ABSTRACT OF THE DISCLOSURE

A low temperature fired glass-ceramic system encom-
passing a series of temperature compensating bodies that
cover a range of temperature coefficients from +100
p.p.m./° C. to −1000 p.p.m./° C. This system consists
of calcining a mixture that includes rare earth oxides,
mixing a portion of this blend with calcium titanate,
$CaTiO_3$ and calcining again, and finally firing a portion of
this calcine with a glass formulation at a relatively low
temperature. A slip suspension of this blend can be used
for the manufacture of capacitors, resistors, etc.

CROSS-REFERENCES TO RELATED APPLICATIONS

The present application is a continuation-in-part of
U.S. patent applications Ser. No. 626,245, filed Mar. 27,
1967 now abandoned and Ser. No. 767,046, filed Sept. 26,
1968, now Patent No. 3,619,220.

BACKGROUND OF THE INVENTION

This invention relates to a low temperature fired
ceramic body, and a method of making same. Conven-
tional ceramic compositions must be fired to maturity at
relatively high temperatures—above 2200° F. When a
multi-layered capacitor employing a high temperature
ceramic is formed, the electrodes must be high melting
and inert under the capacitor forming conditions. Palla-
dium, one of the platinum group materials, employed as
the electrode material in this type of a capacitor unit,
presently sells for over $30.00 per troy ounce. If the
capacitor formation temperature can be reduced signifi-
cantly, without greatly sacrificing capacitance per volume,
then the less expensive electrode materials such as silver,
which sells for about $1.75 per troy ounce, or silver-
palladium alloys can be employed.

Accordingly, it is an object of the present invention
to produce a low firing temperature ceramic body that
can utilize a relatively inexpensive electrode material and
possess characteristics attributable to electrical compo-
nents.

SUMMARY OF THE INVENTION

This invention is concerned with a low temperature
fired ceramic body comprising three different mixtures of
compounds. The first mixture, Blend A consists of rare
earth oxides, titania and a carbonate, all these being wet
ball milled and in a conventional manner, dried and
optionally calcined at 2350°–2450° F. A portion of this
blend is then taken and wet ball milled with calcium
titanate, then dried and calcined at 2450°–2600° F. with
at least one hour soak at peak temperature (this is Blend
B). And finally a portion of Blend B is then mixed with a
glass formulation (this combination is Blend C). This
mixture is ball milled in a suitable organic medium to
form a slip suspension for the manufacture of capacitors.
The final firing temperature of these bodies varies from
a minimum of 1300° F. to a maximum of 1600° F.,
depending on the composition of the particular tempera-
ture coefficient body. The less glass used in Blend C, the
higher the firing temperature of the body will be. Because
the body can be fired between 1300 and 1600° F., one
can employ the less expensive silver electrode, since
silver melts at above this prescribed firing range.

It is to be understood that a ceramic-glass body can be
obtained by employing as the low firing temperature glass
formulation, one containing only CdO, $Bi_2O_3$, PbO, and
at least one of the glass-forming oxides ($B_2O_3$ or $SiO_2$).
Optimum characteristics, however, are obtained by the
inclusion of preferred proportions of the other oxides
listed herein. This is the same glass formulation described
in the above-mentioned application Ser. No. 767,046.

The low firing temperature ceramic composition of
the present invention can be employed in forming capaci-
tors, resistors, thermistors, etc. which utilize electrode,
resistor or thermistor films of low sintering or low firing
temperature materials such as gold, silver, copper, certain
silver-palladium alloys, or alloys of any combination
thereof.

An electrical component comprising the low tempera-
ture fired ceramic body of the present invention will con-
sist essentially of a proportion of calcined Blend A, and
calcined Blend B, in combination with a glass formula-
tion material and at least one metallic film located within
said body. The metallic film can be a resistance material,
a planar inductance coil, or when at least two metallic
films are within said body separated by a layer of said
ceramic, the structure will define a capacitor. A compo-
nent obviously may include all three electrical compo-
nents.

BRIEF DESCRIPTION OF THE DRAWING

FIG. 1 shows a cross section of a capacitor unit em-
ploying the ceramic of this invention; and FIG. 2 illustrates a microcircuit that is within the
scope of this invention.

DESCRIPTION OF THE PREFERRED EMBODIMENTS

The present invention presents a glass-ceramic system
that permits the use of a less expensive electrode system,
because the body herein is fired at a relatively low tem-
perature.

The proces of obtaining this glass-ceramic system can
be divided into three separate steps. They are as follows:
Blend A—this blend contains a rare earth oxide (didym-
ium carbonate), titanium oxide and optionally magne-
sium carbonate with the following composition range in
percent by weight:

|                  | Percent |
|------------------|---------|
| Rare earth oxide | 66–83   |
| $TiO_2$          | 14–30   |
| $MgCO_3$         | 0–5     |

These oxides are wet ball milled in the conventional way,
dried and calcined at 2350°–2450° F.

Blend B.—This blend contains calcined Blend A and calcium titanate with the following composition range in percent by weight:

| | Percent |
|---|---|
| Calcined Blend A | 5–90 |
| Calcium titanate | 10–95 |

These oxides are again wet ball milled, dried, and then calcined at 2450°–2600° F. with at least one hour soak at the peak temperature.

Blend C.—This blend consists of calcined Blend B and a glass formulation, having the following composition range in percent by weight:

| | Percent |
|---|---|
| Calcined Blend B | 37–55 |
| Glass | 45–63 |

The composition of the low firing temperature glass used herein has the following percentage range by weight:

| | Percent |
|---|---|
| CdO | 20–40 |
| $Bi_2O_3$ | 18–32 |
| PbO | 16–35 |
| $B_2O_3$ | 0–10 |
| $Al_2O_3$ | 0–2 |
| ZnO | 0–7.5 |
| $SiO_2$ | 0–8 |
| CaO | 0–5 |

This is essentially the glass formulation of the pending application Ser. No. 767,046. Both of the ingredients of Blend C are ball milled in a suitable organic medium to form a slip suspension to be used in the manufacture of capacitors. The firing temperature of the various bodies made up herein, varies from a minimum of 1300° F. to a maximum of 1600° F., depending upon the percent composition of the particular TC body. These units will fire with a one hour total cycle, and at least 20 minutes in the hot zone.

The following examples are TC bodies that are described by a number with a letter prefix. The prefix P means that above +25° C. the capacitance will rise with the temperature (a positive coefficient); N means the capacitance will drop (or a negative coefficient); and NPO signifies no change. Thus a designation of N750 means that for every degree centigrade that the temperature increases, the capacitance will drop 750 parts per million.

EXAMPLE I

NPO body, TCC, 0±30 p.p.m./°C.

Blend A:

| | Percent |
|---|---|
| Rare earth oxide | 74 |
| $TiO_2$ | 22 |
| $MgCO_3$ | 4 |

Blend B:

| | Percent |
|---|---|
| Calcined Blend A | 78 |
| $CaTiO_3$ | 22 |

Blend C:

| | Percent |
|---|---|
| Calcined Blend B | 40 |
| Glass | 60 |

The above body will fire at 1500° F. The preferred composition of the glass used in Blend C consists essentially of CdO, 36%; $Bi_2O_3$, 23%; PbO, 25%; ZnO, 5%; $B_2O_3$, 5%; $SiO_2$, 5% and $Al_2O_3$, 1%, and is dry mixed, then melted in a platinum crucible at 1800° F. and quenched. This glass is then crushed and milled in deionized water so that the mixture is about 70% solids. This mixture was milled for about 15 hours to achieve a particle size of less than 1 micron. The mixture was then dried and granulated. It is used in Blend C in this form.

The NPO above has a relatively high dielectric constant for an NPO at 36.

Life tests were run on NPO bodies made herein. Capacitors of run No. 1 were made at 100 v./mil. and 125° C., while the capacitors of run No. 2 were larger, had more metallic layers and were made at 190 v./mil. and 125° C. The percent change in capacitance is after 2000 hr. life test:

| | Before test | | After test | | |
|---|---|---|---|---|---|
| Run No. | Ave. cap. | Dissipation factor, percent | Ave. cap. | Dissipation factor, percent | Percent change in cap. |
| 1 | [1] 855.0 | 0.08 | 854.9 | 0.05 | 0.01 |
| 2 (fired at 1,500° F.) | [2] 1,436.9 | 0.05 | 1,435.1 | 0.05 | 0.13 |
| 2 (fired at 1,550° F.) | [2] 1,347.0 | 0.05 | 1,345.7 | 0.05 | 0.09 |

[1] Capacitance measurements taken at 1 mHz., 0.5 VAC, 25° C.
[2] Capacitance measurements taken at 1 kHz., 2.5 VAC, 25° C.

A total of 69 units were tested under the above conditions for 2000 hours, and no failures were found.

EXAMPLE II

N750, TCC, ±100/250 p.p.m./° C.

For this N750 body an optimum composition would be as follows:

Blend A: The same as the NPO formulation of Example I

Blend B:

| | Percent |
|---|---|
| Calcined Blend A | 7.5 |
| $CaTiO_3$ | 92.5 |

Blend C:

| | Percent |
|---|---|
| Calcined Blend B | 47.5 |
| Glass | 52.5 |

This body will fire at 1500° F. and has a dielectric constant of about 75 and a dissipation factor of less than 0.1% at both 1 mHz. and 1 kHz. The glass used in Blend C should be of the preferred composition used in Example I.

EXAMPLE III

N300 body, TCC, ±50 p.p.m./° C.

For this N300 body an optimum composition would be as follows:

Blend A: The same as for the NPO formulation of Example I

Blend B:

| | Percent |
|---|---|
| Calcined Blend A | 30 |
| $CaTiO_3$ | 70 |

Blend C:

| | Percent |
|---|---|
| Calcined Blend B | 47.5 |
| Glass | 52.5 |

This composition should be fired at approximately 1500° F. and will produce a body having a dielectric constant of around 60 and a dissipation factor of less than 0.1% at both 1 mHz. and 1 kHz.

EXAMPLE IV

P50 body, TCC, ±25 p.p.m./° C.

To obtain a P50 body, an optimum composition would be as follows:

Blend A: The same as for the NPO body

Blend B:

| | Percent |
|---|---|
| Calcined Blend A | 85 |
| $CaTiO_3$ | 15 |

Blend C: The same as for the NPO body.

This composition should be fired at approximately 1500° F. and will produce a body having a dielectric of about 33, and a dissipation factor of less than 0.1% at both 1 mHz. and 1 kHz.

It is clear therefor that in order to make a major shift from one TC body to another, the ratio of Blends A to B will be varied, while minor or fine adjustments in the TC body can be made by varying the amounts of Blend C used. Major variations in the percentage of Blend C will also shift the TCC, however, if you go beyond the prescribed ranges for Blend C the firing temperature of the body formed will shift accordingly—that is, if you use too small an amount of glass in Blend C, it will require a higher firing temperature, and the less expensive electrode system cannot be employed.

FIG. 1 shows a capacitor unit 10 employing the low firing temperature ceramic of this invention wherein metallic film layers 11 are extending to the middle of the capacitor unit from alternate sides separated by layers of the said ceramic material 12 forming a capacitor.

In forming an inductor the same low firing temperature ceramic body can be employed and it may or may not contain ferromagnetic material. For a much higher inductance a ferrite or high ferromagnetic system can be employed. A coil pattern of silver, gold, silver-palladium alloys, etc., can be screened on the substrate while it is in the green state and then a top layer of the inventive composition can be applied to form a monolithic inductor.

FIG. 2 shows a microcircuit 13 having ceramic layers 16, 17 and 18 composed of the low firing temperature ceramic of the present invention. Positioned between layers 16 and 17 are an inductor 14 and a resistor 15.

The specific examples above, all indicate the same basic percentage mixture for Blend A, that is, 74% rare earth oxide, 22% titanium dioxide and 4% magnesium carbonate. This basic, fundamental composition can be employed in most TC bodies. However, these percent ranges may also be varied as outlined herein earlier depending upon the composition desired of the particular TC body. The term rare earth oxide is used herein in its general sense. Didymium carbonate was used in the preferred embodiment, however any of the rare earth group may be used herein. "Didymium" is the name commonly used now to define the rare earth ore found in nature that has been treated to remove almost all of the cerium therein. Didymium carbonate contains approximately the following percents by weight:

| | Percent |
|---|---|
| $La_2O_3$ | 29.5 |
| CeO | 1.0 |
| $Pr_6O_{11}$ | 6.2 |
| $Nd_2O_3$ | 21.1 |
| $Sm_2O_3$ | 3.6 |
| $Gd_2O_3$ | 2.3 |
| $Y_2O_3$ | 0.3 |
| Other rare earth oxides | 1 |
| $CO_2$ | 35.0 |

It should be noted that the rare earth compounds are put into Blend A as a carbonate but upon firing or calcining the net constituents will be the oxides thereof. Rare earth oxides or hydrates are alternative choices for introducing the rare earth group into the final body desired. And while magnesium carbonate is specified herein it should be understood that other carbonates may also be used such as calcium carbonate, barium carbonate, etc., or any other Group II (A) elements; or alternatively the oxide, or the titanate of these elements can be used, for example, BaO or $BaTiO_3$. The $TiO_2$ and $MgCO_3$ of Blend A form $MgTiO_3$ upon calcining. This manner of introducing the titanate is preferred because it is more economical than directly adding the purified and laboratory prepared titanate.

It should also be understood that while calcium titanate is preferred in Blend B other titanates may be used interchangeably with similar, although less desirable, results.

In forming a resistor as shown in FIG. 2, any of the well known resistor inks can be employed providing the firing temperature thereof is compatible with the firing temperature of the ceramic substrate. The fabrication of a resistor is very similar to that of a capacitor. The low firing temperature ceramic slip or paste can be deposited on a temporary substrate to any desired thickness. A metal resistor ink can be screened on and any desired pattern and a top layer of the low firing temperature slip applied over the resistor ink. The resistor can be cut to the desired size in the green state and silver terminal pick ups applied. Thereafter, the units can be fired within the proper temperature range.

A preferred electrode system to be used with the ceramic bodies of the present invention can be either silver for the lower firing bodies or a silver-palladium alloy for those bodies firing at a slightly higher temperature.

As is evident from the foregoing, the invention is not to be limited to formation of the rather specific illustrative examples. Modifications and variations, as well as the substitution of equivalents may be made without departing from the spirit and scope of the invention as defined in the appended claims.

What is claimed is:

1. A method of forming a low temperature fired ceramic body, which comprises:

mixing and calcining at 2350°–2450° F. a composition (Blend A) consisting essentially of:

| | Percent |
|---|---|
| Rare earth oxide | 66–83 |
| $TiO_2$ | 14–30 |
| $MgCO_3$ | 0–5 | mixing and calcining at 2450°–2600° F. a composition (Blend B) consisting essentially of:

| | Percent |
|---|---|
| Blend A | 5–90 |
| $CaTiO_3$ | 10–95 | mixing a composition (Blend C) consisting essentially of 35–55% of calcined Blend B, and 45–65% of a glass formulation;

forming a body with Blend C; and firing said body at a temperature of between 1300° F. and 1600° F.

2. The method of claim 1 wherein said glass formulation consists essentially of:

| | Percent |
|---|---|
| CdO | 20–40 |
| $Bi_2O_3$ | 18–32 |
| PbO | 16–35 |
| $B_2O_3$ | 0–10 |
| $Al_2O_3$ | 0–2 |
| ZnO | 0–7.5 |
| $SiO_2$ | 0–8 |
| CaO | 0–5 |

3. The method of claim 1 wherein said glass consists essentially of:

| | Percent |
|---|---|
| CdO | 36 |
| $Bi_2O_3$ | 23 |
| PbO | 25 |
| $B_2O_3$ | 5 |
| $Al_2O_3$ | 1 |
| ZnO | 5 |
| $SiO_2$ | 5 |

4. The method of claim 3 wherein said calcined Blend A consists essentially of:

| | Percent |
|---|---|
| Rare earth oxide | 74 |
| $TiO_2$ | 22 |
| $MgCO_3$ | 4 | said calcined Blend B consists essentially of:

| | Percent |
|---|---|
| Calcined Blend A | 78 |
| $CaTiO_3$ | 22 | and said fired Blend C consists essentially of:

| | Percent |
|---|---|
| Calcined Blend B | 40 |
| Glass | 60 | and wherein said Blend C is fired at 1500° F.

5. The method of claim 1 wherein at least one metallic film is formed within said body, said metallic film is a member selected from the group consisting of gold, silver, copper, silver-palladium alloys, and mixtures thereof.

6. A low temperature fired ceramic body formed by the method of claim 1.

7. A low temperature fired ceramic body formed by the method of claim 2.

8. A low temperature fired ceramic body formed by the method of claim 5.

References Cited
UNITED STATES PATENTS

| | | | |
|---|---|---|---|
| 3,293,077 | 12/1966 | Kaiser et al. | 117—217 |
| 3,490,927 | 1/1970 | Kahn et al. | 106—39 R |
| 3,549,415 | 12/1970 | Caper et al. | 117—221 X |
| 3,619,220 | 11/1971 | Maher | 106—39 R |

TOBIAS E. LEVOW, Primary Examiner

W. R. SATTERFIELD, Assistant Examiner

U.S. Cl. X.R.

106—39 R; 117—217; 161—213; 252—520, 521; 264—61